United States Patent

[11] 3,571,796

[72] Inventor Richard D. Brugger
Erie, Pa.
[21] Appl. No. 732,603
[22] Filed May 28, 1968
[45] Patented Mar. 23, 1971
[73] Assignee The Bendix Corporation

[54] ROTATION TRANSLATION INDEPENDENT FEATURE EXTRACTION MEANS

9 Claims, 6 Drawing Figs.

[52] U.S. Cl. .......... 340/146.3, 250/219, 250/227
[51] Int. Cl. .......... G06k 9/00
[50] Field of Search .......... 340/146.3; 250/219 (lcr), 227

[56] References Cited

UNITED STATES PATENTS

| | | | |
|---|---|---|---|
| 2,919,426 | 12/1959 | Rohland | 340/146.3 |
| 2,968,789 | 1/1961 | Weiss et al. | 340/146.3 |
| 3,177,470 | 4/1965 | Galopin | 340/146.3 |
| 3,255,436 | 6/1966 | Gamba | 340/146.3 |
| 3,311,749 | 3/1967 | Briggs | 250/227 |

*Primary Examiner*—Thomas A. Robinson
*Attorneys*—Plante, Arens, Hartz and O'Brien, Bruce L. Lamb and William G. Christoforo

ABSTRACT: A means of electrically extracting optical information from an optically recognizable pattern regardless of the orientation of the pattern within the field of view and comparing the information extracted against electrical criteria so as to classify the pattern wherein the pattern image is projected onto an image slicer which utilizes fiber optics to divide the image into a plurality of slices. Electrical processing is used to assign a number to each slice which is proportional to the light flux incident upon the slice and to square the assigned number. All the squared numbers are added to generate a voltage which is memorized. The image is then rotated with respect to the slicer and subsequent voltages are generated and memorized. The memorized voltages are then compared to an electrical template to determine the classification of the pattern and its orientation within the field of view.

PATENTED MAR 23 1971

3,571,796

INVENTOR
RICHARD D. BRUGGER

BY William G. Christoforo
ATTORNEY

INVENTOR
RICHARD D. BRUGGER

BY William G. Christoforo
ATTORNEY

ROTATION TRANSLATION INDEPENDENT FEATURE EXTRACTION MEANS

BACKGROUND OF THE INVENTION

This invention relates to automatic pattern recognition and more particularly to feature extraction of optically recognizable patterns regardless of the orientation of the pattern within the field of view.

Several techniques for extracting features from optical patterns have become known. The simplest technique is direct mask matching wherein the pattern under test is compared with an optical template and the optical template rotated. The match of the template to the object is a measure of the object classification.

Another approach is the so-called photocell array and Adaline technique which uses an array of photocells wherein each photocell looks at a region of the object directly without a template and integrates the light flux from that region to generate an electrical signal, correlative to the optical detail of the object, which is compared to an electrical template for fit. This technique has the disadvantage that translation or rotation of the object under study will generate false alarms or incorrect classification unless a large number of templates covering other aspects of the object to be classified are included for comparison and some means provided for determining the relevant aspect template to be used in the comparison.

In the modification of the Adaline technique the array contents are stored in a computer memory. Computer subroutines can then give binary interpretation of the data about various thresholds, computation of moments, determination of size, arc length, number of corners, etc. The results of these tests can be tabulated and used in a decision process.

Another technique is the so-called flying spot scanner and computer wherein the computer steers a spot of light over the test object and evaluates the response in terms of information obtained about neighboring regions. This technique allows for programming of a large variety of scanning patterns, and is thus very flexible. However, the advantages of flexibility and high resolution are offset by the critical and complex means required to accomplish the recognition task if the task does not require high quality processing.

BRIEF SUMMARY OF THE INVENTION

For many pattern recognition tasks, it is desirable to measure features of the object scene and use these features instead of the original object scene as input to the pattern recognition mechanism. Features are considered here as generalizations possessing certain desirable invariances such as translation and rotation. It thus becomes necessary, where the object scene does not possess these invariances, to be able to extract the features to be measured regardless of the orientation of the object scene with respect to the scanning mechanism to obtain these rotational and translational independent (RTI) features.

The means embodied by this invention for obtaining RTI features can be conveniently broken down into two distinct processes. The first process emphasizes form such that measurements of a pattern's form are not dependent upon the location of the object scene as long as the pattern remains entirely within the scene. The second process uses the output of the first process and allows the additional invariant of rotation.

It is thus an object of this invention to allow feature extraction from an object scene regardless of the orientation of the object scene within the field of view.

It is another object of this invention to provide means to classify an object regardless of its orientation with the field of view.

A still further object is to provide an optical slicer which linearly integrates light flux incident upon input face slices.

DESCRIPTION OF THE PREFERRED EMBODIMENT

Theory

Figures 1A, 1B, 2, 3:
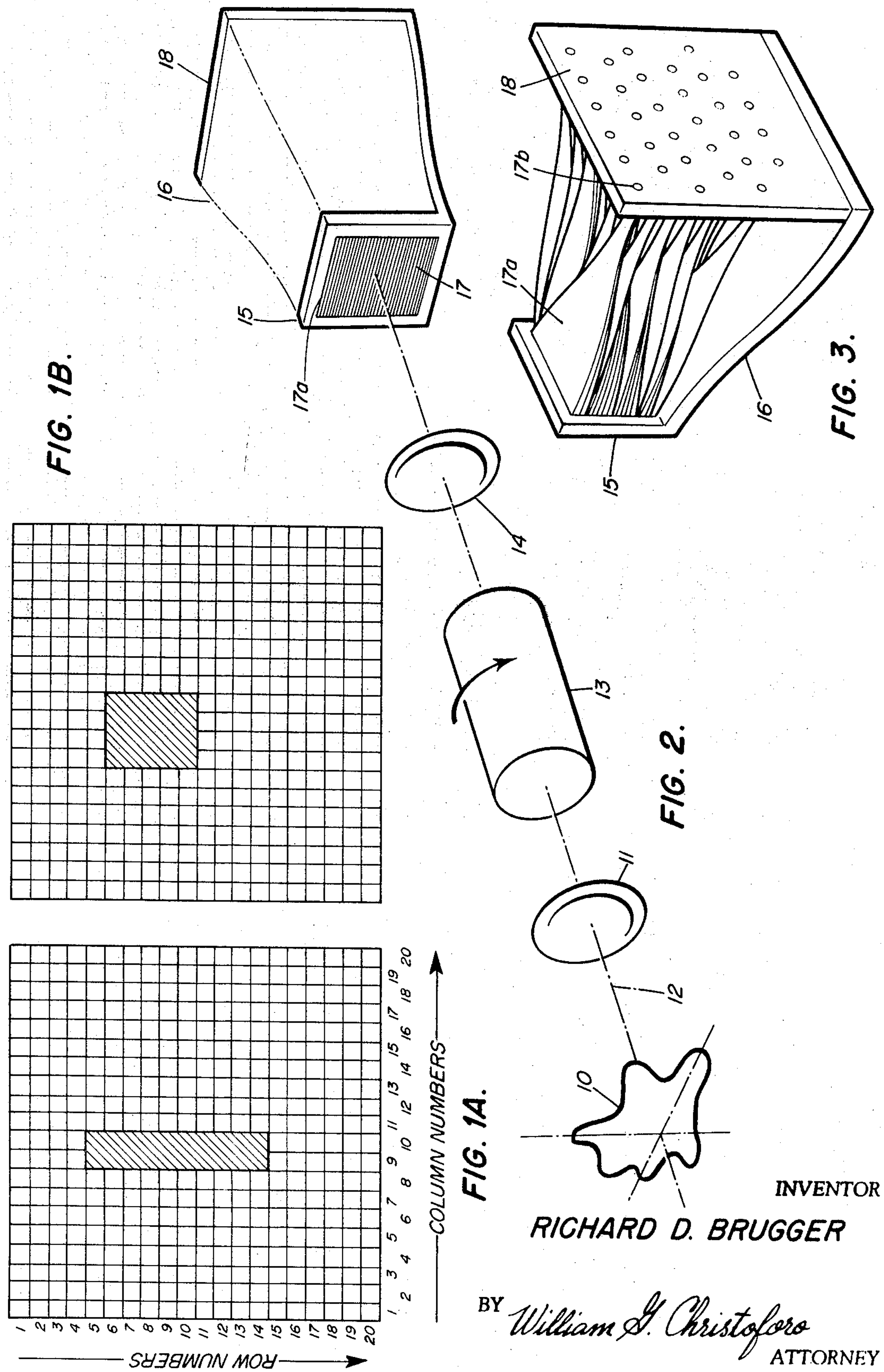
FIGS. 1A and 1B show simple rectangular figures superimposed against an orthogonal background.
FIG. 2 shows an object scene being scanned.
FIG. 3 is an isometric view of an optical slicer.

Before discussing the actual embodiment of the invention, the theory underlying the embodiment will be discussed. With reference thereto, consider a field of view (FIG. 1A) which is broken into 20 columns and 20 rows, thus forming 400 small areas. Assume there is enclosed in the field a long narrow bar 10 units by 2 units. Consider also FIG. 1B whose field of view, which is identical to that shown in FIG. 1A, encloses a wider and shorter bar, 5 units by 4 units, having the same area as the bar shown in FIG. 1A. It is desired to distinguish between these two patterns.

Assign a numerical value of one to each of the dark areas and zero to each of the light areas. Proceed as follows for FIG. 1A. Sum the numbers of the first column and square the sum which can now be called $C_1$. Repeat the procedure for each of the other columns and for the sum $C_1 + C_2 + \ldots C_{20}$ = "Column Sum." It can be seen that $C_9$ and $C_{10}$ are both equal to 100 and the others are zero. Thus, the column sum is equal to 200. "Row Sum" is defined as the sum of the squares of the contents of the rows. The squares of sums of rows 5 through 14 are 4 and the others are zero. Thus, the "Row Sum" is equal to 40.

From a comparison of "Column Sum" and "Row Sum" it is obvious that the pattern is considerably taller than it is wide. While the ratio of the "Column Sum" to the "Row Sum" can also be seen to be the aspect ratio, it is suggested that it not be considered in that sense, since aspect ratio will lose significance when this same process is applied to irregularly shaped patterns.

It should also be obvious now that the aforementioned nonlinear process of taking measurements does emphasize form and that although a squaring process is described, any nonlinear process will produce a numerical output which is correlative to the pattern's orientation within the field of view. Independence of the measurements from the location of the pattern when translated up, down, right or left, but always registering with the grid of columns and rows should also be obvious.

A 90° rotation of either pattern makes "Row Sum" equal to what the "Column Sum" previously was and vice versa. Thus, a horizontal or vertical bar is an identifiable pattern in terms of the measurements discussed to this point.

Suppose, however, that the bar shown in either FIGS. 1A or 1B is rotated by 45°. "Column Sum" will now equal "Row Sum" and would lead to the erroneous decision that the pattern was not a bar. Clearly, additional measurements are needed to obtain rotational invariance.

Before the theory for obtaining rotational invariance is discussed, an ideal processor will be discussed. The idealized processor differs from one which might be implied from the foregoing theory as follows:

1. The field of view is circular instead of square and will be treated as uniformly lighted with the pattern being in the high illuminance region.

2. The pattern need not be rectangular. It can be free form as shown in FIG. 2 item 10.

3. The 20 columns are replaced by a plurality of vertical slices across the field of view. The width of each slice is extremely small.

4. The 20 rows are replaced by a plurality of horizontal slices.

5. In addition to the vertical and horizontal slices, there are numerous slices at other angles.

The operation of the idealized processor will now be discussed. Assume a pattern in the circular field of view. Choose an axis $\alpha$ and consider the slices parallel thereto. Integrate the light flux through each such slice and generate voltages proportional thereto. Square the voltages individually, add the squares and call the sum the $\alpha$ sum.

Consider the slices parallel to the $\beta$ axis which is at an angle $\Delta\theta$ from axis $\alpha$. Determine in the manner above described the $\beta$ sum. Continue the process N times where $N\Delta\theta=\pi$ radians. There is no need to consider more than N axes since the data thereafter becomes redundant. That is, an axis at $N\Delta\theta$ gives results identical to that obtained from the $\alpha$ axis.

This sequence of voltages ($\alpha$ sum, $\beta$ sum, etc. constitutes a representation of the original pattern. Note in particular that each voltage represents the entire object scene and is not dependent upon the position of the object as long as it remains totally within the field of view and is not rotated.

If the pattern is now shifted by an angle $\Delta\theta$, the data, that is $\alpha$ sum, $\beta$ sum, etc. is shifted by one step.

Recognition, despite a shift in data, can be effected by comparing the data to a stored replica of the reference pattern data N times, while offsetting the stored data one place for each comparison. If it is desired to recognize a particular pattern represented by $\alpha$ sum $= V_1$, $\beta$ sum $= V_2$, etc. construct an electrical replica of the pattern comprised of a series of weights $Wi$ where $Wi$ is equal to the magnitude and sign of $Vi$ for all $i$ from 1 to $N$. This set of weights will give a peak response whenever the reference input appears.

Essentially, this is a correlator whose peak response will be selected by a peak detecting circuit. When this correlator is combined with the pattern coding technique described with reference to the nonrotated pattern, a feature extraction technique having the desired invariances to translation and rotation is produced. Of course, the invention can be used with known matched filter or Adaline techniques to provide more precise feature extraction information.

FIG. 2 shows in part how the theory is implemented and reference should now be made thereto. An object 10 is placed on optical axis 12 of slicer 16 and collimating lenses 11 and 14 so that the image of object 10 is cast upon input face 17 of slicer 16. An image rotator 13, suitably a dove prism or a three-prism rotator system, allows the image cast on input face 17 to be rotated about optical axis 12, the significance of which will be explained below.

Slicer 16 is comprised of structural members front panel 15 and rear panel 18 and input face 17 which is in turn comprised of a plurality of horizontal slices of which optical slice 17*a* is the topmost. Referring now to FIG. 3, an isometric view of slicer 16, optical slice 17*a* is seen to be the input end of a bundle of fiber optics which transforms optical slice 17*a* to circular bundle 17*b* arranged in rear panel 18. Similarly, other input face optical slices are converted to circular bundles at the rear panel. The circular format of the fiber bundle is compatible with commercially available photo sensors, one of which can now be arranged to be illuminated by each circular bundle.

Figure 4:
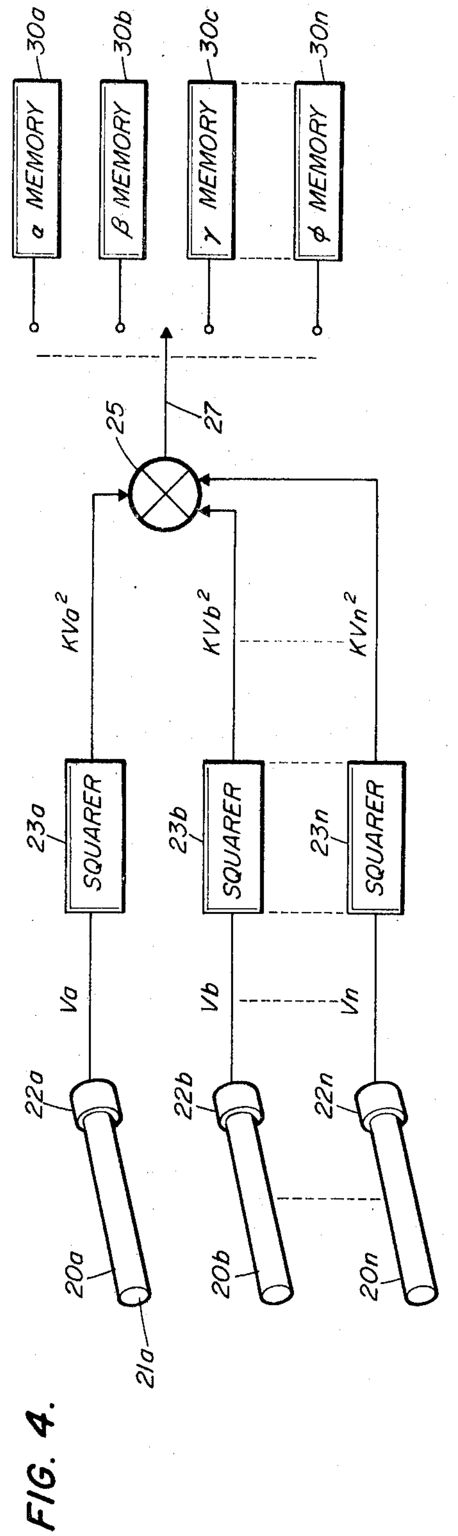
FIG. 4 is a block diagram of a number of sensors and memories.

One consideration with respect to the transition from the optical slice to a circular bundle and then to illumination of the photocell is that each fiber in the circular bundle corresponds to a specific location in the input face and each fiber has a numerical aperture which relates to the size of the solid angle through which light flux exits from the fibers. Note that some fibers are near the center of the bundle and others are on the outside. Commercially available mounted photocells normally have the active element recessed from the front face of the cell package. Unless the active cell area is much larger than the circular bundle, the light flux from the center fiber will transmit a much higher percentage of its light to the active area of the cell than an outside fiber can. In the theory it was explained in substance that cell output should be proportional to the linear integral of the light flux incident upon an input face slice. The above requirement is met by using acrylic plastic rods polished at both ends and pressed against the fiber optics output (circular bundle) at one end and against the photocell active area at the other end. Rod diameters and lengths must be selected such that light rays are incident on the rod's sides at an angle beyond the critical angle so that several reflections are made down the rod before the light reaches the entrance window of the photocell. Coherence due to particular locations of the individual fibers in the bundle is essentially destroyed and the desired transition from image slice to photocell established. This is seen in FIG. 4, to which reference should now be made. Acrylic rod 20*a*, which has end 21*a* polished and pressed against a fiber bundle output, for example, circular bundle 17*b* seen in FIG. 3, forms an optical bridge therefrom to photocell 22*a*. Photocell output voltage, $Va$, which is proportional to the linear integral of the light flux incident upon optical slice 17*a*, is squared and scaled in squarer 23*a* to generated voltage $KVa^2$. The light flux incident upon other of the optical slices is similarly processed. The scaled and squared voltages are totalled in summer 25 and applied sequentially through switch 27 to the memory bank comprised of memory cells 30*a* to 30*n*, one memory cell being provided for each image rotational position to be sampled. Thus, switch 27 must be synchronized with image rotator 13 (FIG. 2) so that data obtained when the image is oriented along the $\alpha$ axis is stored in memory cell 30*a*, data obtained when the image is oriented along the $\beta$ axis is stored in memory cell 30*b*, etc.

Each memory cell typically comprises a capacitor arranged to be charged through switch 27 when the image axis is proper, and a phase locked loop driven by the voltage stored across the capacitor so as to preserve the memory data so stored, and an output gate which samples the memory when opened.

Figure 5:
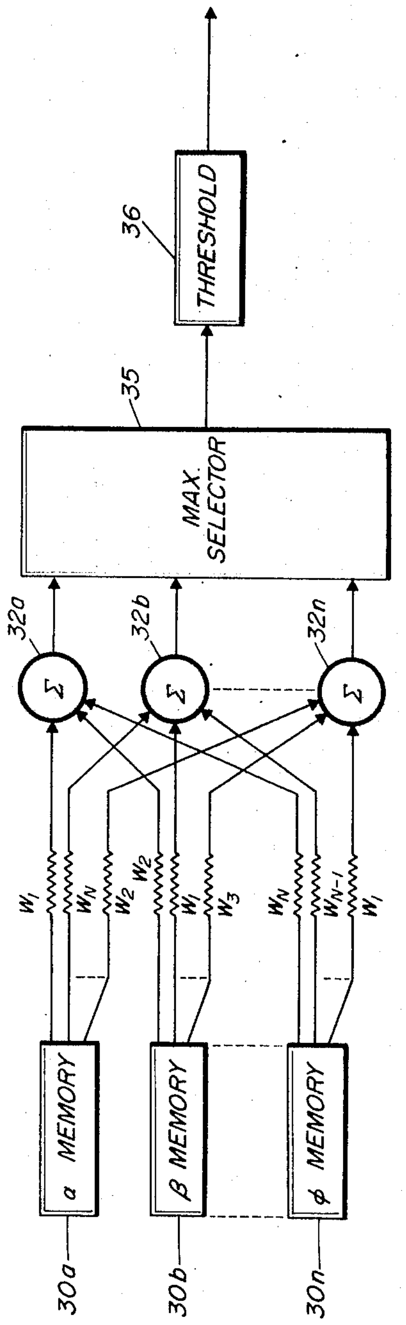
FIG. 5 is a block diagram of the recognition mechanism.

Referring now to FIG. 5 memory cells 30*a* to 30*n* are again seen. At the completion of the image rotation on the input face (FIG. 2) the memory cell gates are simultaneously triggered open and the memory cells sampled through a weighing matrix comprised of resistors $W_1$ to $W_N$ where $N$ is the number of memory cells and in which each resistor $Wi$ appears $N$ times. The weights $Wi$ comprise the electrical template against which the obtained data is compared. The sampled and weighted memory outputs are summed in summers 32*a*. It will be noted that the weights are shifted one step for each different summer so that, for example, summers 32*a*, 32*b* and 32*n* receive respectively $$\alpha W_1+\beta W_2 \dots \Phi W_N$$

$$\alpha W_N+\beta W_1 \dots \Phi W_N-1$$

$$\alpha W_2+\beta W_3 \dots \Phi W_1.$$

The maximum summer output is determined by maximum selector 35 which also determines which summer produced the maximum output. This latter information can be used to determine the direction in which the image sensed is pointed, while the former information is applied to threshold 36 which will generate an output dependent upon the classification of the image.

It should be obvious to one skilled in the art that the electrical matrix can be made to take other forms and additionally, can be made programmable, in essence increasing the number of electrical data against which the data stored in the memory cells can be compared so as to increase the classification potentialities of the invention. Other embodiments of my invention should now be obvious to one skilled in the art if my teachings are followed, therefore not wishing to limit the invention to the specific form shown I accordingly claim as my invention the subject matter including modifications and alterations thereof encompassed by the true scope and spirit of the appended claims.

I claim:

1. Means for extracting data correlative to features of an object comprising:

an image slicer having an input face divided into parallel slices for linearly integrating the light flux incident upon each said slice;

means for casting the image of said object upon said input face;

means for optically rotating said image with respect to said input face;

means for generating voltages having a nonlinear relationship to the light flux incident upon each said slice;

means for summing said voltages;

means for memorizing said summed voltages at $N$ predetermined rotational positions during rotation of said image;

$N$ electrical adders; and an $N \times N$ matrix of electrical weights connected between said memorizing means and said adders whereby each said adder generates a voltage proportional to a particular matrix product of said memorized voltages with said electrical weights, all said adder generated voltages taken simultaneously comprising said data correlative to features of said object.

2. Data-extracting means as recited in claim 1 with additionally threshold means responsive to said adder generated voltages.

3. Data-extracting means as recited in claim 1 wherein said image slicer comprises a plurality of fiber optic bundles, each said bundle forming a transition between an output end where said fibers are arranged in a circular bundle and an input end where said fibers are arranged in a rectangular bundle at said input face, each said rectangular bundle comprising one said parallel slice.

4. Data-extracting means as recited in claim 3 wherein said voltage generating means comprises a plurality of means for generating a voltage proportional to light flux incident thereon, one said means for each said fiber optic bundle;

means for coupling light flux from each said fiber optic bundle output end to each said proportional voltage generating means; and nonlinear means for scaling said proportional voltages.

5. Data-extracting means as recited in claim 4 wherein said plurality of proportional voltage generating means comprises a plurality of photocells.

6. Data-extracting means as recited in claim 5 wherein said light coupling means comprises a plurality of light conductive rods interposed between said fiber bundle output ends and said photocells and of such size as to destroy light flux coherence due to particular locations of individual of said optic fibers.

7. Data-extracting means as recited in claim 5 wherein said light coupling means comprises a plurality of acrylic rods of such diameter and length that light rays traversing said rods from an input end to an output end are incident upon the sides of said rods at an angle beyond the critical angle so that several reflections from said sides are made.

8. Data-extracting means as recited in claim 4 wherein said nonlinear means comprises squaring means for squaring said proportional voltages.

9. Data-extracting means as recited in claim 1 wherein said $N$ predetermined rotational positions are taken at equal increments of said image rotation.